United States Patent [19]
Garza

[11] Patent Number: 5,535,643
[45] Date of Patent: Jul. 16, 1996

[54] ANTI-RATTLE ENGINE BALANCER WHICH DRIVES ASSOCIATED OIL PUMP

[75] Inventor: Michael A. Garza, Lansing, Mich.

[73] Assignee: General Motors Corporation, Detroit, Mich.

[21] Appl. No.: 150,310

[22] Filed: Nov. 12, 1993

[51] Int. Cl.⁶ .............................. F16C 3/20; F02B 75/06
[52] U.S. Cl. ............................................ 74/603; 123/192.2
[58] Field of Search .......................... 74/591, 603, 604, 74/573 R, 574; 123/192.2

[56] References Cited

U.S. PATENT DOCUMENTS

| | | |
|---|---|---|
| 3,667,317 | 6/1972 | Hillingrathner. |
| 3,710,774 | 1/1973 | Weseloh et al.. |
| 4,545,341 | 10/1985 | Corey et al. .......................... 123/192.2 |
| 4,703,724 | 11/1987 | Candea et al.. |
| 4,766,857 | 8/1988 | Laine et al. .......................... 123/192.2 |
| 4,856,486 | 8/1989 | Mori et al. .......................... 123/192.2 X |

*Primary Examiner*—Charles A. Marmor
*Assistant Examiner*—Mary Ann Battista
*Attorney, Agent, or Firm*—Charles K. Veenstra

[57] ABSTRACT

A Lanchester type engine balancer avoids rattle of gears connecting counterrotating balance shafts by minimizing inertia through limiting diameters of the counterweight envelopes, timing gears and bearing journals of the balance shafts and by driving an accessory, such as an oil pump from the driven balance shaft. Gear lash is controlled by using a cast iron housing with select fitting of steel gears. Also maximum gear pitch diameter runout is oriented in assembly opposite the counterweights of the respective balance shafts to minimize a change in lash caused by shaft runout due to the eccentric load of the counterweights during operation.

1 Claim, 4 Drawing Sheets

ANTI-RATTLE ENGINE BALANCER WHICH DRIVES ASSOCIATED OIL PUMP

TECHNICAL FIELD

This invention relates to engine balancers and in particular to so-called Lanchester balancers having two weighted countershafts connected by timing gears.

BACKGROUND

It is known in the art relating to in-line four cylinder four stroke cycle engines to provide a so-called Lanchester balancer having a pair of balance shafts carried in a housing below the crankshaft and oppositely rotated at twice crankshaft speed to generate a vertical shaking force offsetting the secondary unbalance of the usual four cylinder engine arrangement. One of the shafts is usually driven by a gear or chain from the engine crankshaft and the balance shafts are connected for counterrotation by a pair of drive and timing gears.

A common problem of such balancers is a noise known as gear rattle and generally occurring at engine idle. This rattle is due to the teeth of the timing gears losing contact and impacting the adjacent teeth. It is caused by a fluctuation in crankshaft speed between the firing pulses of succeeding cylinders. Elimination of this gear rattle noise is desired.

SUMMARY OF THE INVENTION

The present invention provides solutions to the problem of balancer gear rattle at idle through recognition of its cause and cure and development of balancer configurations capable of operating rattle free. It is recognized that rattle occurs when the rotational speed variation of the driving balance shaft is sufficient to cause the gear of the driven balance shaft to lose tooth contact and "rattle" as mentioned. This results when the angular acceleration of the driven shaft assembly times its polar moment of inertia is greater than the drag torque on the shaft when the drive torque is zero.

To avoid this condition, the balancer is designed to minimize the shaft inertia and increase the drag torque where necessary to maintain the gear teeth in driving contact at all times.

In a preferred embodiment, the balancer has a cast iron two piece housing containing balance shafts with longitudinally extended counterweights of limited radial extent for rotation within a small diameter envelope of rotation. The shafts are closely spaced and connected by steel timing gears only slightly larger than the counterweight envelopes. Bearings in the housing support shaft journals that are of smaller diameter than the counterweight envelopes as is permitted by the two piece housing. These features combine to minimize the inertia of the balance shafts in operation. The gear backlash is also closely controlled by design, selection of materials and assembly procedures.

In applications where the shaft inertia is still excessive, the drag on the driven shaft may be increased by using it to drive an accessory load, preferably the engine oil pump. This increases the drag torque already applied to the shaft by the bearings. Thus, a combination of features may be provided in a balancer to maintain the drag torque greater than or equal to the inertia torque during idle speed variations of the crankshaft and thereby avoid the occurrence of gear rattle in the balancer.

These and other features and advantages of the invention will be more fully understood from the following description of certain specific embodiments of the invention taken together with the accompanying drawings.

BRIEF DRAWING DESCRIPTION

DETAILED DESCRIPTION

Figure 1:
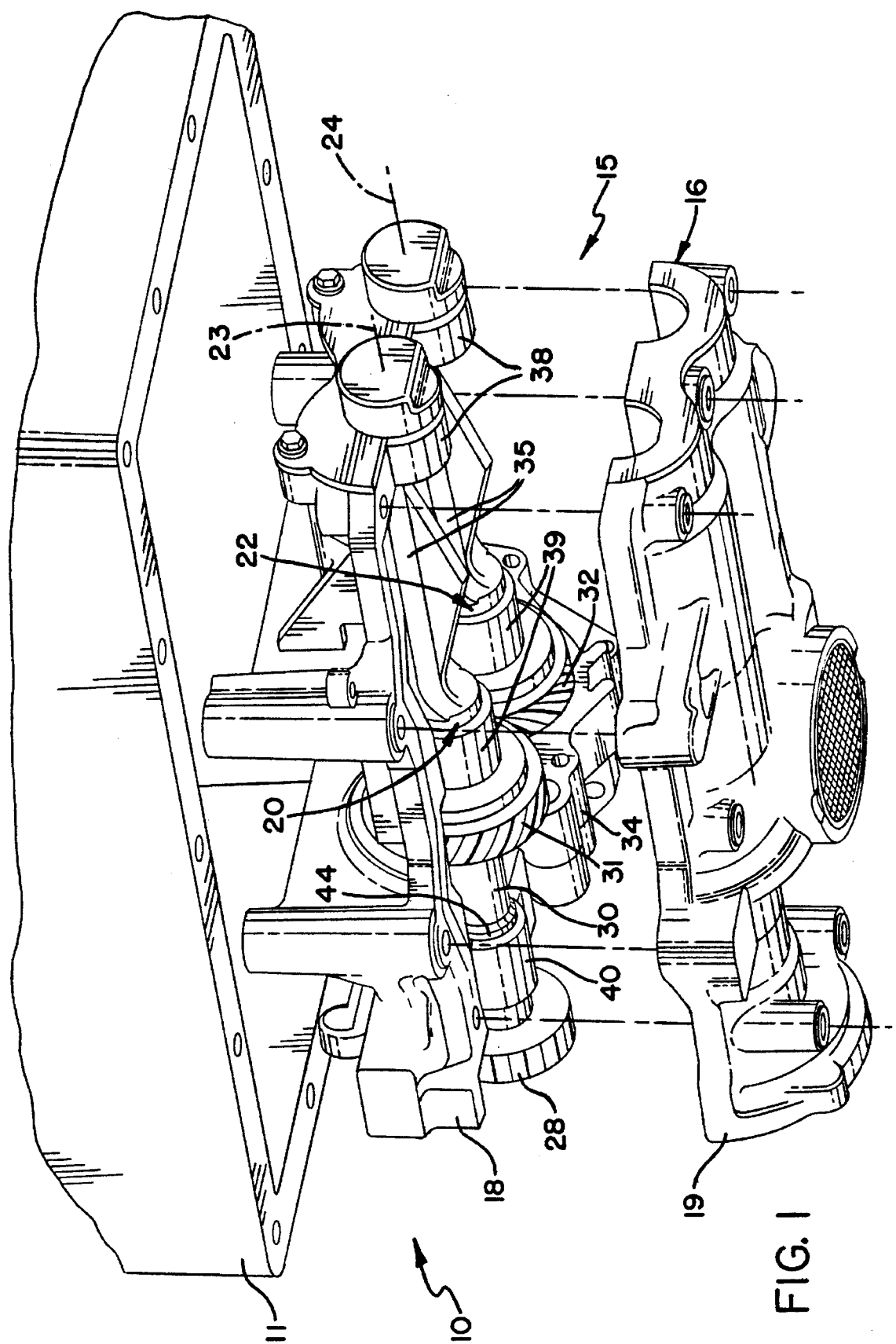
FIG. 1 is an exploded pictorial view of a balancer in accordance with the invention as mounted to the crankcase portion of an associated engine.
Figure 2:
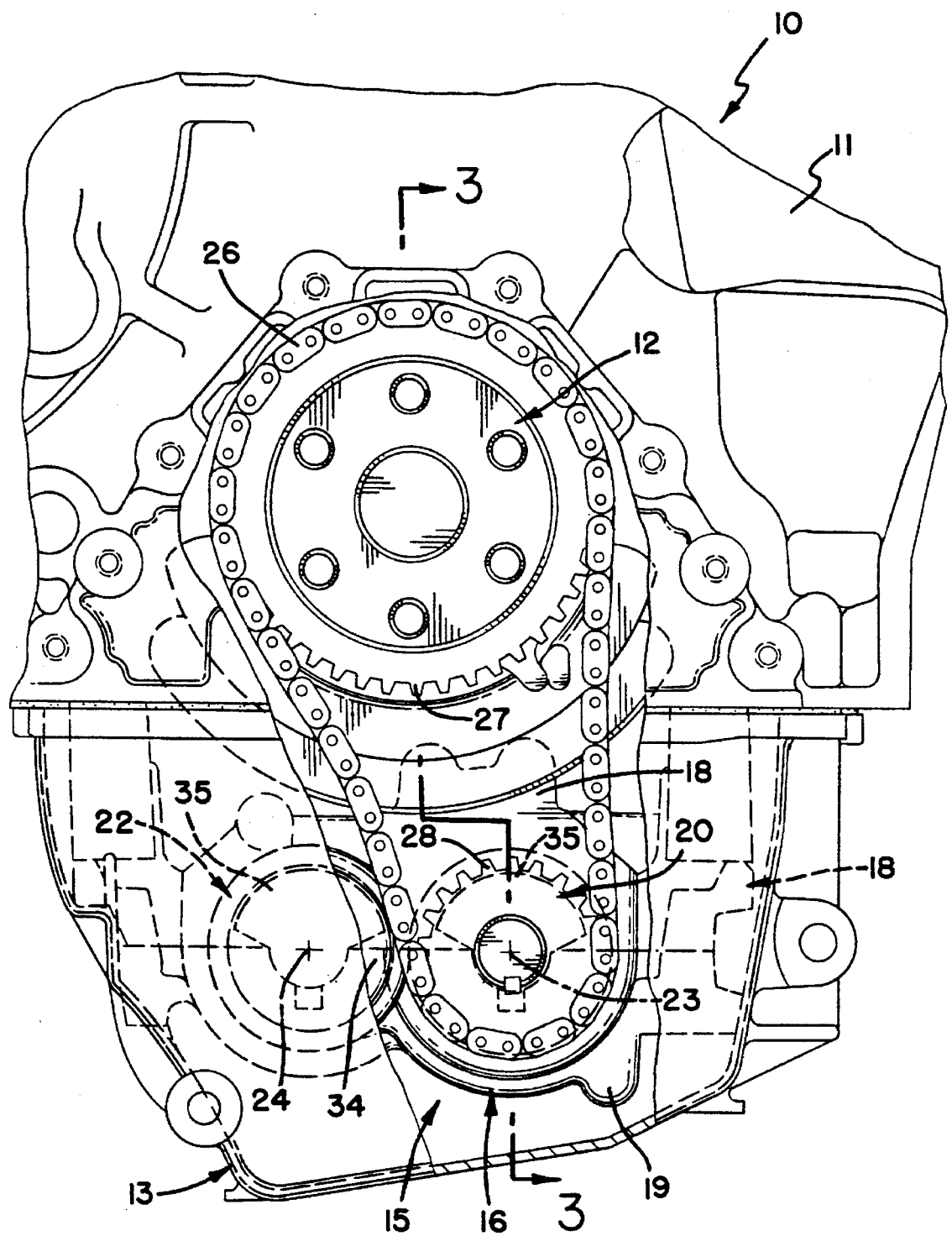
FIG. 2 is a rear end view of the engine installed balancer showing the chain drive arrangement.
Figure 3:
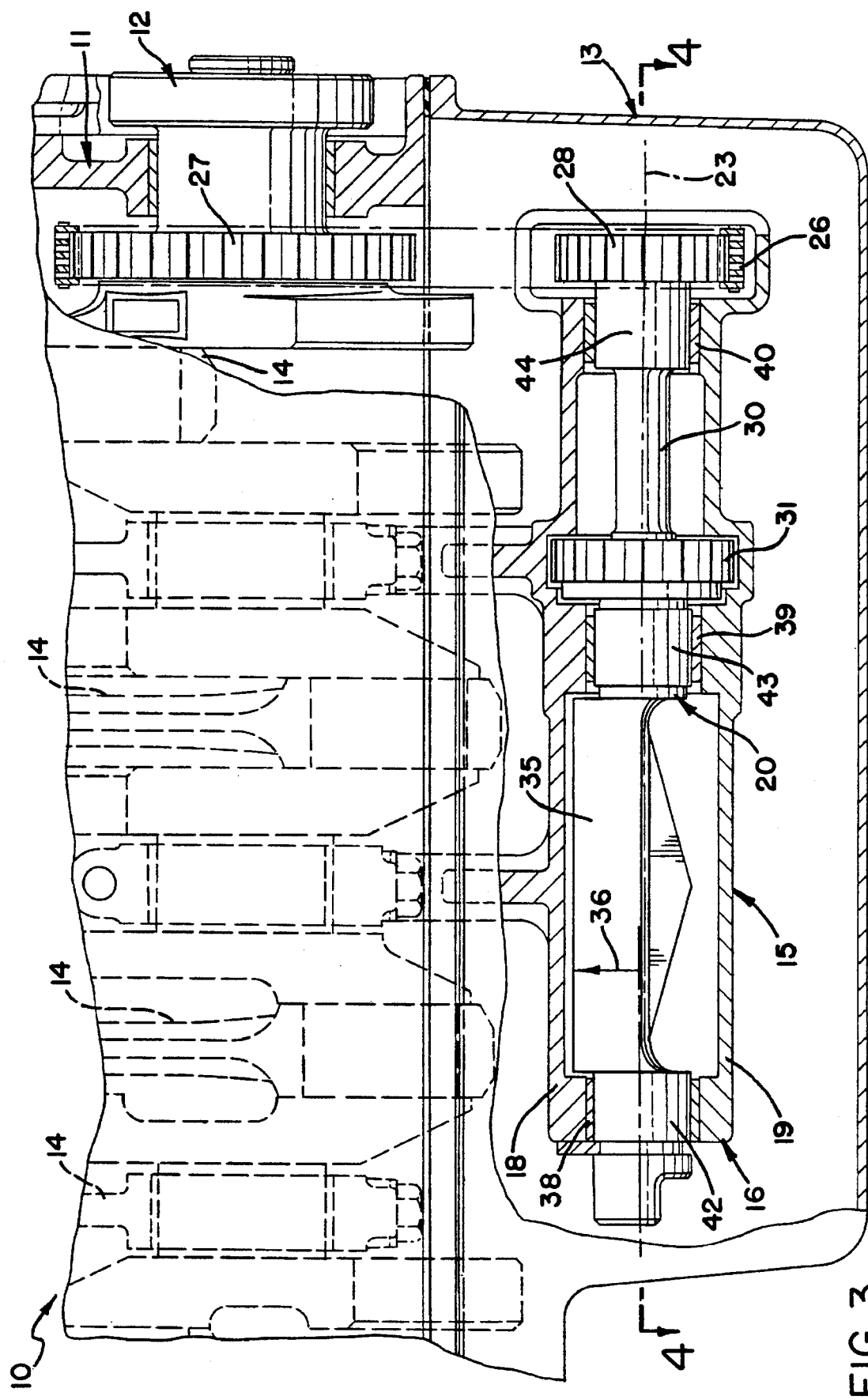
FIG. 3 is a lengthwise cross-sectional view through the engine and balancer from the plane of the line 3—3 of FIG. 2.
Figure 4:
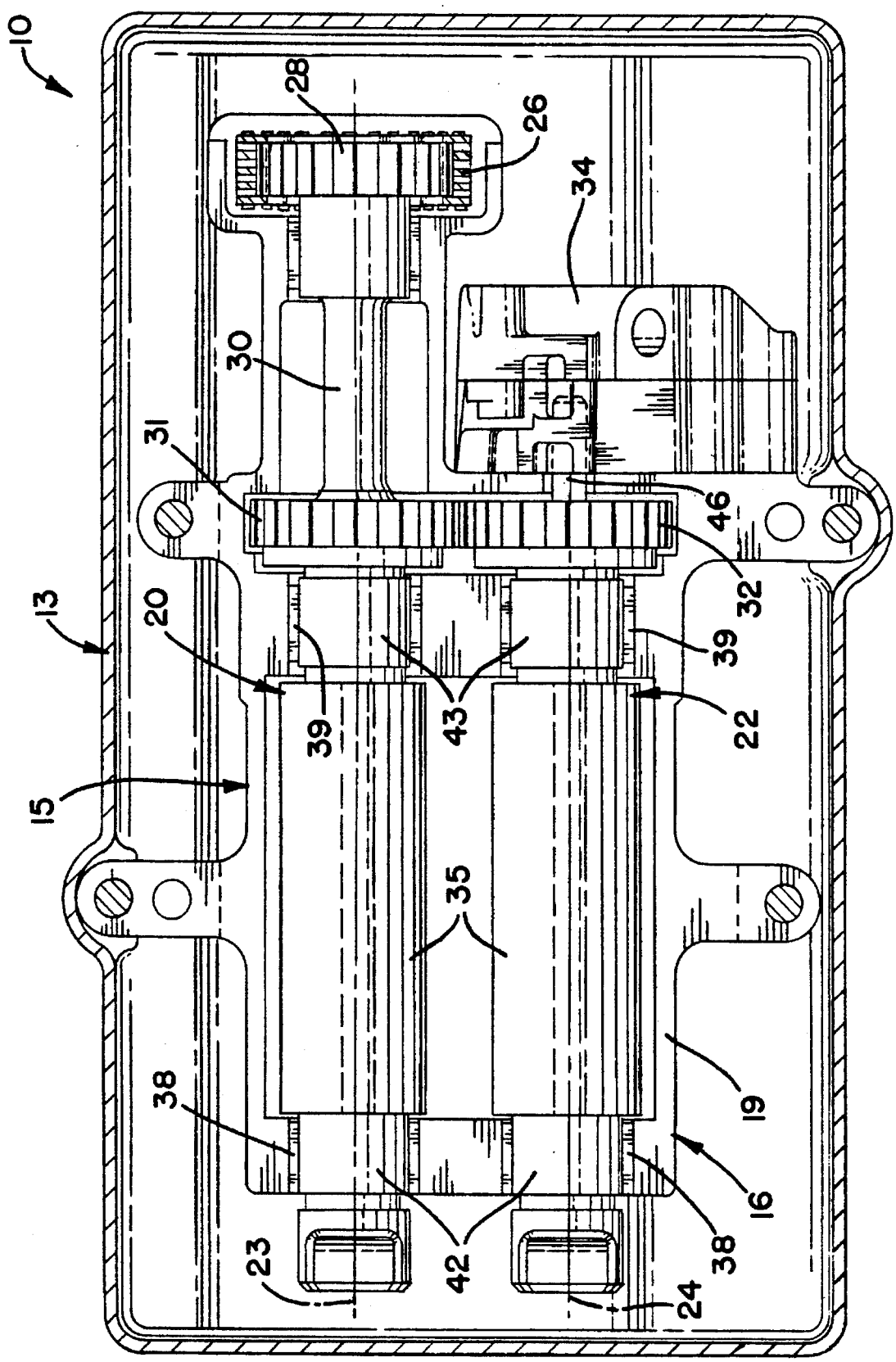
FIG. 4 is a cross-sectional view downward from the plane of the line 4—4 of FIG. 3.

Referring now to the drawings in detail, numeral 10 generally indicates a four-stroke cycle four cylinder in-line engine having a cylinder block 11 including cylinders and pistons, not shown. A crankshaft 12 is rotatably carried in a crankcase portion of the block that is closed downwardly by an oil pan 13 in conventional fashion. Connecting rods 14 connect throws of the crankshaft with the pistons, reciprocation of which, in operation, causes a second order vibration unbalance in the form of a vertical shaking force cycling at twice the crankshaft speed.

To balance this secondary vibration, the engine is provided with a balancer 15 of the well known Lanchester type. The balancer includes a housing 16, preferably made of cast iron and split horizontally into upper 18 and lower 19 sections. Means are provided for securing the housing to the lower portion of the engine crankcase, below the crankshaft. Within the housing 16 are carried first 20 and second 22 balance shafts oppositely rotatable on laterally spaced parallel axes 23, 24. The balancer includes a combination of specific features selected in response to the magnitude of engine crankshaft cyclic speed variations in idle operation in order to avoid a problem of gear rattle common in Lanchester balancer applications.

The balancer is driven at twice crankshaft speed by a chain 26 connecting a drive sprocket 27 near the rear of the crankshaft with a driven sprocket 28 on an extension 30 of the first balance shaft 20. Timing gears, preferably steel, including a drive gear 31 and a driven gear 32 respectively connect the first and second balance shafts for timed equal and opposite rotation. A gerotor type oil pump 34 mounted to the rear of the housing 16 connects with and is driven by the second balance shaft 22.

The balance shafts each include offset portions which comprise counterweights 35. The shaking force to be developed by these weights 35 must be equal and opposite to that of the engine secondary unbalance force, but the rotating inertia of the shafts can be minimized by making the weights 35 relatively long with an outer radius 36 as small as possible. The timing gears 31, 32 are made with outer diameters only slightly larger than the diameter of the imaginary envelope defined by the rotating counterweights. This diameter equals twice the outer radii of the balance shaft counterweights. The gear diameters are made small to minimize the contribution of the gears to the inertia of the shafts. However, they are larger than the counterweight envelopes to provide the necessary clearance between the rotating counterweights of the adjacent balance shafts.

The chain drive from the crankshaft to the balancer is preferable to the common method of driving one of the timing gears directly from a crankshaft gear because this would require larger drive and timing gears to maintain the spacing of the balancer below the crankshaft. The chain drive thus helps permit the timing gear inertia to be minimized.

The balance shafts are carried on five bearings, two front end bearings 38 located at the front ends of the counterweights 35, two rear end bearings 39 located adjacent the timing gears and one drive bearing 40 adjacent to the driven sprocket 28. Journals 42, 43, 44 on the shafts and their mating bearings 38, 39, 40, respectively, are made with diameters as small as reasonably possible to also assist in minimizing the inertia of the balance shafts. An extension 46 of the rear end of the driven (second) balance shaft 22 drives the oil pump 34 mounted on the housing 16.

Another feature of the preferred balancer embodiment is the minimizing of backlash in the timing gears by the selection in assembly of gears for matching pitch diameters to control the amount of backlash. Variation in backlash during operation, due to orbiting of the balance shafts in their bearings caused by the counterweight unbalance, is minimized by measuring the pitch diameter runout, or eccentricity, of the gears and, during assembly, locating the maximum runout radii opposite the counterweights of the associated shafts. Use of a cast iron housing equalizes temperature effects on the housing and the steel timing gears so that gear backlash variations are minimized.

Minimizing the diameters of the counterweight envelopes, timing gears and the bearing journals all contribute to minimizing the balance shaft inertia. This allows the torque drag of bearing friction to more easily slow the rotation of the driven shaft during slowing of the crankshaft speed during cyclic speed variations and reduce the potential for separation of the contact of the timing gear teeth which results in gear rattle. Driving of the engine oil pump 34 from the driven (second) balance shaft provides an additional feature helping to avoid gear rattle. The pump provides an additional load on the driven balance shaft which helps further slow the shaft rotation and overcome the inertia force during speed reducing portions of the speed variations.

While the invention has been disclosed by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

What is claimed is:

1. An engine balancer having a housing, a pair of first and second balance shafts rotatably carried in the housing on laterally spaced parallel axes, means for connecting the first balance shaft with the crankshaft of an associated engine for rotation in predetermined timed relation therewith whereby the first balance shaft rotates at a speed determined by the crankshaft, a pair of gears connecting the first balance shaft with the second balance shaft for driving the second balance shaft in counterrotation at a speed equal to the speed of the first balance shaft, the balance shafts including counterweights laterally offset from their respective shaft axes and timed to cause when rotated a cyclic shaking force, journals on the balance shafts and engaging bearings in the housing for supporting the balance shafts, wherein the shaft journals are of smaller diameter than envelopes traced by rotation of the counterweights, the counterweights are longer than the diameters of the counterweight envelopes, and the shaft connecting gears are only slightly larger in diameter than the counterweight envelopes, wherein an oil pump carried by the housing is driven by the second balance shaft to apply rattle reducing load to the shaft connecting gears, wherein the housing has at least two sections with a parting line intersecting the balance shaft journal bearings to permit the diameter of the bearing journals to be minimized, wherein the gear, counterweight and bearing journal diameters are sufficiently small that the polar moment of inertia of the second balance shaft times the maximum angular acceleration of the second balance shaft during engine idle operation does not exceed the drag torque acting thereon, and wherein the maximum pitch diameter runout of the shaft connecting gears is oriented diametrically opposite to the center of mass of the counterweights of their respective balance shafts.

* * * * *